UNITED STATES PATENT OFFICE 1,959,392

N-SUBSTITUTED PHENYL ALKYLOL AMINES

Friedrich Stolz and Franz Flaecher, Frankfort-on-the-Main-Hoechst, Germany, assignors to Winthrop Chemical Company, Inc., New York, N. Y., a corporation of New York No Drawing. Application January 22, 1931, Serial No. 510,584. In Germany January 31, 1930

3 Claims. (Cl. 260—128.5)

Our present invention relates to aromatic aliphatic alkamines, more particularly to alkamines of the following general formula

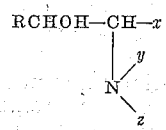

wherein R stands for an aromatic radical which may be substituted by —O—R', in which R' is hydrogen or aralkyl, $x$ for alkyl or hydrogen, $y$ for aryl, alkyl, alkenyl or aralkyl, and $z$ for aralkyl or aralkenyl.

The said substances can be produced by carefully reducing the corresponding ketones or by introducing an aralkyl- or aralkenyl radical into such aromatic aliphatic alkamines of the same structure as contain a secondary alkyl- or alkenyl amino group, or by introducing into corresponding alkamines containing a primary amino group one or two aralkyl- or aralkenyl radicals and, if desired, alkylating the products obtained.

The new bodies possess a remarkable physiological activity. Particularly the substances show a good anesthesizing power and a spasmolytic action and can be used in therapy, for instance, for curing asthma.

The following examples illustrate the invention:

1. 60 g. of α-methylbenzylaminopropiophenone are dissolved in 600 cc. of absolute alcohol and the boiling solution is gradually mixed with 33 g. of sodium. Then the solution is acidified with dilute hydrochloric acid and the alcohol is distilled off. The distillation residue is dissolved in water and shaken out with ether. The 1-phenyl-2-benzyl-methyl-aminopropanol(1) base is thereafter separated by means of caustic soda solution and taken up in ether. The base melts at 74° C. to 75° C. and its hydrochloride recrystallized from water or absolute alcohol melts at 169° C. to 170° C. The yield amounts to about 60 per cent. of the theoretical.

The reaction takes place according to the following equation

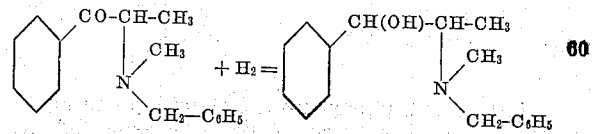

Instead of the α-methylbenzylaminopropiophenone the corresponding hydrochloride can be used with the same good result.

2. 30 g. of α-methylbenzylaminopropiophenone are dissolved in 300 cc. of aqueous ether and the boiling solution is mixed with 16.5 g. of sodium while adding from time to time a small amount of water in the form of drops. The solution is further treated as indicated in Example 1. The yield amounts to about 65 per cent.

3. 230 g. of 1-phenyl-2-methylaminopropanol(1) are dissolved in 250 cc. of benzene and heated for some hours with 127 g. of freshly distilled benzylchloride to a temperature of 100° C. The whole is then filtered by suction in order to obtain the phenylpropanolmethylamine-hydrochloride which has separated; the latter is washed with benzene. After distillation of the benzene the residue is dissolved in dilute hydrochloric acid and shaken out with ether. The base separated by means of an alkali melts at 74° C. to 75° C. The hydrochloride of the base recrystallized from water or absolute alcohol melts at 169° C. to 170° C. The yield is nearly quantitative.

The reaction takes place according to the following equation:

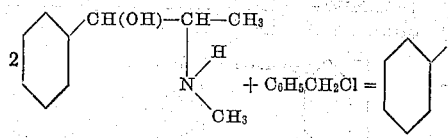

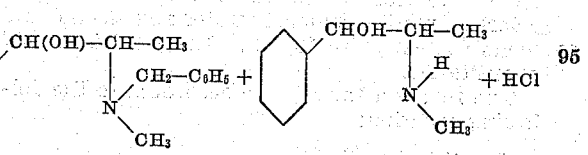

4. 8 g. of 1-phenyl-2-methylaminopropanol (1) are dissolved in 30 cc. of warm benzene and the solution is mixed with 5 g. of cinnamylbromide. It is allowed to stand for 2 hours at room temperature; the whole is then filtered with suction to eliminate the phenylmethylaminopropanol-hydrobromide formed and the filtrate is shaken out with dilute hydrochloric acid, while adding such a quantity of water that the thick oil drops which separate are dissolved. The aqueous extract is filtered until it is clear, rendered alkaline by means of ammonia, shaken with ether, the ether is distilled off, the residue is dissolved in absolute alcohol, and hydrochloric acid is introduced until there is an acid reaction to Congo paper. The alcohol is distilled under a strongly reduced pressure and the 1-phenyl-2-methyl-cinnamylaminopropanol(1) - hydrochloride remains which is triturated with acetone and filtered by suction. When recrystallized from water it forms colorless crystals which are rather difficultly soluble in water and alcohol and melt at 175° C. The yield is nearly quantitative.

The reaction takes place according to the following equation:

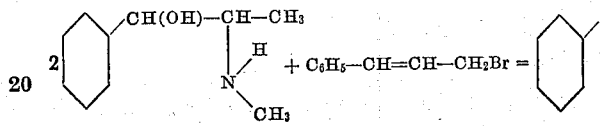

5. 8 g. of 1-phenyl-2-methylaminopropanol(1) are dissolved in 30 cc. of warm benzene and the solution is mixed with 4.6 g. of p-methylbenzylbromide. It is allowed to stand for 5 to 6 hours and then further treated as indicated in Example 4. Thus the 1-phenyl-2-(p-methylbenzyl)-methylaminopropanol(1)-hydrochloride of the following formula

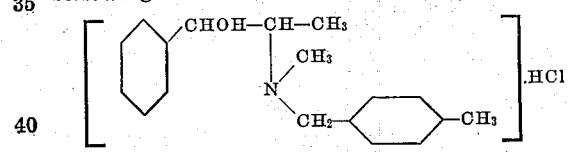

is obtained. It melts at 207° C. The yield is nearly quantitative.

6. 15.1 g. of 1-phenyl-2-aminopropanol(1) are dissolved in 75 cc. of benzene and the solution is mixed with 8.5 g. of benzylbromide. After a short heating on the water bath the liquid is allowed to stand for about 1 day at room temperature. The 1-phenyl-2-aminopropanol-(1)-hydrobromide formed is eliminated by filtering with suction and the filtrate is evaporated in a vacuum. The residue obtained is taken up in water and ether, separated and the ethereal solution is dried over sodium sulfate. The solution is filtered and the 1-phenyl-2-benzylaminopropanol(1)-hydrochloride is precipitated by introducing gaseous hydrochloric acid. The hydrochloride is recrystallized from a mixture of methanol and ether. It is colorless, readily soluble in water and alcohol and melts at 192° C. to 193° C. The yield is nearly quantitative.

The reaction takes place according to the following equation:

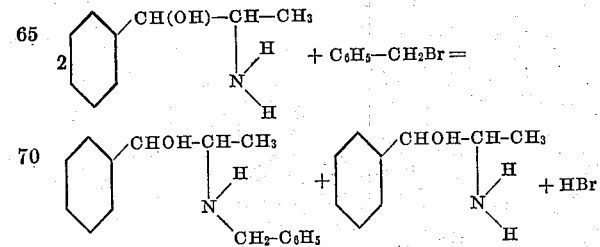

7. 4.6 g. of sodium in 120 cc. of alcohol are mixed with a solution of 21.7 g. of p-hydroxy-1-phenyl-2-methylaminopropanol(1) hydrochloride in 300 cc. of alcohol. The sodium chloride which at once separates is eliminated by filtering with suction and the filtrate is boiled in a reflux apparatus for 2 hours with 17.1 g. of benzylbromide. After distillation of the excess of alcohol the residue is mixed while stirring with very dilute caustic soda solution, whereby the mass is directly decomposed into parts of crystalline structure. The mixture is filtered by suction and subsequently washed with a small amount of water. The p-benzylhydroxy-1-phenyl-2-methylaminopropanol(1) is caused to react with benzylbromide without any further purification. To this end 10.8 g. of the base are dissolved into 150 cc. of benzene and the

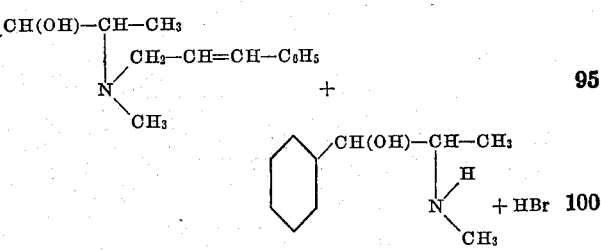

liquid is boiled, after addition of 3.4 g. of benzylbromide, for 4-5 hours in a reflux apparatus. The crystals of p-benzylhydroxy-1-phenyl-2-methylamino-propanol(1) hydrobromide which separates after cooling are filtered by suction and subsequently washed with benzene. The clear, filtered benzene solution is now completely evaporated in the vacuum and the remaining oily residue is taken up in dry ether. The solution is filtered and the p-benzylhydroxy-1-phenylbenzyl-2-methylaminopropanol(1) hydrochloride of the formula

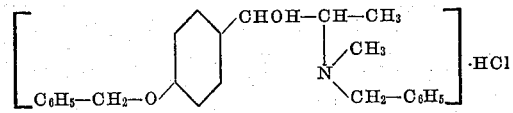

is obtained from the ether solution in an almost quantitative yield by introducing gaseous hydrochloric acid. When recrystallized from a mixture of methanol and ether it melts at 178° C. to 179° C.

8. 20 g. of 1-phenyl-2-aminopropanol are dissolved in 100 cc. of benzene and 12.5 g. of cinnamylbromide are added; the solution is allowed to stand for some hours at ordinary temperature. The 1-phenyl-2-aminopropanolhydrobromide which crystallizes out is separated by filtering with suction and washed out with benzene. The main part of the benzene is distilled off, the residue is neutralized with hydrochloric acid and the 1-phenyl-2-cinnamylamino-propanol(1) hydrochloride of the formula

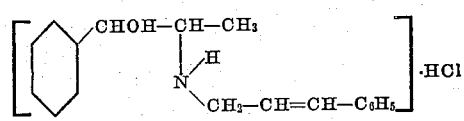

is precipitated by means of ether. After filtering by suction, the hydrochloride is washed with acetone and ether and recrystallized from alcohol. It is colorless, difficultly soluble in water and alcohol and melts at 228° C. to 229° C. The yield is nearly quantitative. In order to free it from phenyldicinnamylaminopropanol hydrochloride with which it may be mixed, the base is separated with alkali and recrystallized from acetone. This base dissolves more difficultly in acetone than the phenyldicinnamylaminopropanol base. It melts at 101° C. to 102° C.

9. 24.1 g. of 1-phenyl-2-benzylaminopropanol (1) are dissolved in 50 cc. of benzene and the solution is heated with 6.4 g. of benzylchloride for some hours to boiling temperature. It is allowed to cool, the 1-phenyl-2-benzylaminopropanol hydrochloride which separates is eliminated by filtering with suction and the filtrate is freed from the benzene by distillation. The benzene residue is then mixed with water, rendered alkaline and the base is taken up in ether. After distillation of the ether the residue is dissolved in acetone, acidified by means of alcoholic hydrochloric acid and precipitated with ether. After recrystallization from alcohol the 1-phenyl-2-dibenzylaminopropanol(1) hydrocholride of the following formula

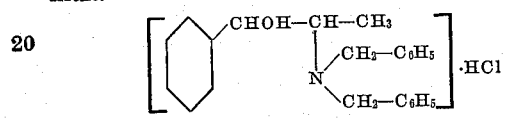

melts at 212° C. to 213° C. The yield is nearly quantitative.

10. A solution of 24.1 g. of 1-phenyl-2-benzylaminopropanol(1) in 50 cc. of benzene is heated to boiling temperature for some time with 10 g. of cinnamylbromide. After cooling the 1-phenyl-2-benzylaminopropanol hydrobromide formed is filtered by suction and washed with benzene. The benzene is then distilled off, the residue is mixed with water, rendered alkaline and shaken out with ether. The ether residue is rendered acid in an acetone solution with alcoholic hydrochloric acid and then mixed with ether. The 1-phenyl-2 - benzylcinnamylaminopropanol(1) hydrochloride of the formula

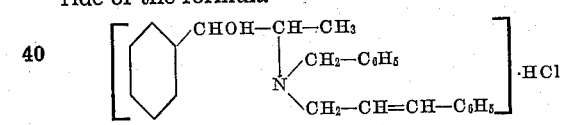

which crystallizes out is filtered by suction and washed with acetone and ether. It is purified by dissolving it in alcohol and precipitating it with ether. It melts at 210° C. The yield is nearly quantitative.

11. 24.1 g. of 1-phenyl-2-benzylaminopropanol (1), 50 cc. of benzene and 6.2 g. of allylbromide are heated for some time to boiling temperature. The 1 - phenyl - 2 - benzylaminopropanol(1) hydrobromide precipitated is eliminated by filtering with suction and the benzene in the filtrate is distilled off. The residue is mixed with water, rendered alkaline and shaken with ether. After evaporation of the ether the product is dissolved in acetone, acidified by means of alcoholic hydrochloric acid and mixed with ether. The 1-phenyl - 2 - benzylallylaminopropanol(1) hydrochloride of the formula

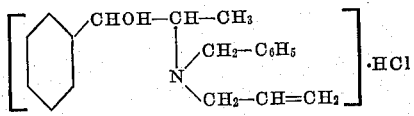

which crystallizes out is filtered by suction and washed with acetone and ether. By dissolving it in alcohol and precipitating with ether it is obtained in a pure state. It melts at 188° C. to 189° C. The yield is nearly quantitative.

We claim:

1. The alkamine of the following formula

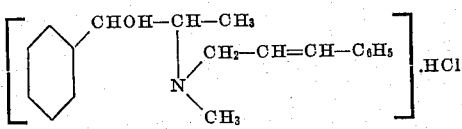

forming colorless crystals, rather sparingly soluble in water and alcohol and melting at 175° C.

2. The compounds of the following general formula:

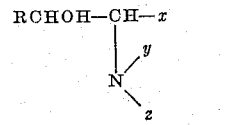

wherein R stands for a phenyl radical which may be substituted in para-position by benzyl-oxy,
$x$ stands for an alkyl group,
$y$ stands for hydrogen, an alkyl group or benzyl,
$z$ stands for benzyl, para-methyl-benzyl, allyl, cinnamyl.

3. The compounds of the following general formula:

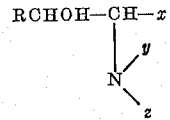

wherein R stands for a phenyl radical which may be substituted in para-position by benzyl-oxy,
$x$ stands for methyl,
$y$ stands for hydrogen, methyl or benzyl and
$z$ stands for benzyl, para-methyl-benzyl, allyl or cinnamyl.

FRIEDRICH STOLZ.
FRANZ FLAECHER.